(12) United States Patent
Mun et al.

(10) Patent No.: US 9,343,778 B2
(45) Date of Patent: May 17, 2016

(54) ELECTROLYTE FOR LITHIUM SECONDARY BATTERY AND LITHIUM SECONDARY BATTERY INCLUDING THE SAME

(75) Inventors: Jun-young Mun, Seoul (KR); Yoon-sok Kang, Seongnam-si (KR); Jin-hwan Park, Seoul (KR); Min-sik Park, Suwon-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 769 days.

(21) Appl. No.: 13/431,512

(22) Filed: Mar. 27, 2012

(65) Prior Publication Data

US 2012/0251895 A1    Oct. 4, 2012

(30) Foreign Application Priority Data

Mar. 30, 2011    (KR) .................... 10-2011-0029037

(51) Int. Cl.
| | | |
|---|---|---|
| H01M 10/0567 | (2010.01) | |
| H01M 10/052  | (2010.01) | |
| H01M 10/0568 | (2010.01) | |
| H01M 10/0569 | (2010.01) | |

(52) U.S. Cl.
CPC ........ *H01M 10/0567* (2013.01); *H01M 10/052* (2013.01); *H01M 10/0568* (2013.01); *H01M 10/0569* (2013.01)

(58) Field of Classification Search
None
See application file for complete search history.

(56) References Cited

U.S. PATENT DOCUMENTS

| 5,731,106 A | 3/1998 | Tsutsumi et al. |
|---|---|---|
| 7,553,588 B2 | 6/2009 | Kim et al. |
| 2005/0019670 A1 | 1/2005 | Amine et al. |
| 2006/0210883 A1 | 9/2006 | Chen et al. |
| 2008/0318136 A1 | 12/2008 | Amine et al. |

FOREIGN PATENT DOCUMENTS

| CN | 102195091 | * 9/2011 |
|---|---|---|
| JP | 2003-155288 | 5/2003 |

OTHER PUBLICATIONS

MSDS of Indole, Sigma-Aldrich, http://www.sigmaaldrich.com/catalog/product/aldrich/w259306?lang=en&region=US, Obtained Apr. 2015.*

(Continued)

*Primary Examiner* — Sarah A Slifka
(74) *Attorney, Agent, or Firm* — Cantor Colburn LLP

(57) ABSTRACT

An electrolyte for a lithium secondary battery, the electrolyte including a lithium salt, a non-aqueous organic solvent, and an additive represented by Formula 1 below:

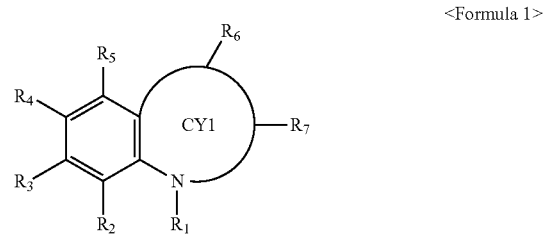

<Formula 1> wherein CY1 and $R_1$ through $R_7$ are the same as defined above; and
a lithium secondary battery containing the electrolyte.

29 Claims, 2 Drawing Sheets

(56) References Cited

OTHER PUBLICATIONS

MSDS of Tryptophan, Sigma Aldrich, http://www.sigmaaldrich.com/catalog/product/sigma/t3300?lang=en&region=US, Obtained Sep. 2015.*

STIC Search for claims 1 and 2, Sep. 2015.*
STIC Search for claim 3, Sep. 2015.*
Machine translation of CN102195091_obtained Sep. 7, 2015.*

* cited by examiner

ELECTROLYTE FOR LITHIUM SECONDARY BATTERY AND LITHIUM SECONDARY BATTERY INCLUDING THE SAME

CROSS-REFERENCE TO RELATED APPLICATIONS

This application claims the benefit of Korean Patent Application No. 10-2011-0029037, filed on Mar. 30, 2011, in the Korean Intellectual Property Office, the disclosure of which is incorporated herein in its entirety by reference.

BACKGROUND

1. Field of the Invention

Aspects of the present disclosure relate to electrolytes for lithium secondary batteries and lithium secondary batteries including the same, and more particularly, to electrolytes for lithium secondary batteries which improve the high temperature lifetime characteristics and high temperature conservation characteristics of the batteries.

2. Description of the Related Art

Lithium secondary batteries are rechargeable at a high speed, and have an energy density per unit weight that is at least three times larger than that of existing lead storage batteries, nickel-cadmium batteries, nickel-hydrogen batteries, or nickel-zinc batteries, and thus research on developing lithium secondary batteries is actively conducted. Generally, a lithium secondary battery includes a positive electrode, a negative electrode, and a separator and an electrolyte disposed between the positive electrode and the negative electrode. With respect to electrolytes, methods of improving the performance of lithium secondary batteries by adding small amounts of additives to the electrolyte without affecting the properties of the electrolyte are highly desirable.

Electrolyte additives have various functions, and some additives serve to form a film, for example, a solid electrolyte interface (SEI), to prevent direct contact between electrode active materials and electrolytes. The additives that form a film on the electrode surface are classified into negative electrode additives helping to form an SEI on a graphite surface and over charge protection (OCP) additives helping to form a thick film on a surface of a positive electrode.

Recently, research on high voltage positive active materials has actively implemented an increased demand for lithium secondary batteries with high energy densities, e.g., a battery for an electric vehicle. However, research has not yet been successful in producing electrolyte additives for preventing the oxidization of electrolytes occurring on surfaces of positive active materials.

Generally, the potential window of an electrolyte should be wider than the potential difference between positive and negative active materials. However, since active materials for a high voltage are used for increasing the energy density of a battery, the potential window of an electrolyte becomes narrower than that of the electrode active materials. Therefore, a film that prevents direct contact between electrolytes and electrode active materials should be formed to prevent electrolytes from decomposing.

The use of aromatic compounds such as biphenyl and terphenyl as electrolyte additives forms a thick film on the surface of the positive electrode when the voltage of the battery becomes sufficiently large, and thus the Li ions cannot pass through the film, thereby stopping current flow. That is, such additives serve to prevent overcharge. Recently, a method of forming a thin film on the surface of a positive electrode using such additives with a low concentration has been proposed. However, it is difficult to obtain satisfactory battery characteristics, thus leaving much room for improvement.

SUMMARY OF THE INVENTION

Provided are electrolytes for lithium secondary batteries, the use of which prevents oxidization thereof on a surface of the positive electrode and which forms a polar thin film on a surface portion of the positive electrode, thereby facilitating the transfer of lithium ions.

Also provided are lithium secondary batteries having excellent high temperature life characteristics and high temperature conservation characteristics.

Additional aspects will be set forth in part in the description which follows and, in part, will be apparent from the description, or may be learned through practice of the presented embodiments by those skilled in the art.

According to an aspect of the present disclosure, an electrolyte for a lithium secondary battery includes a lithium salt, a non-aqueous organic solvent, and an additive represented by Formula 1 below:

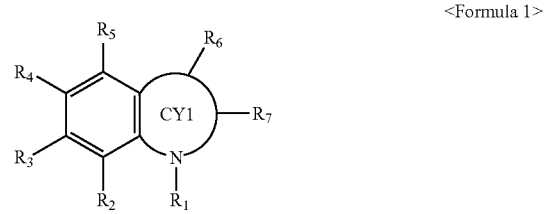

<Formula 1> wherein CY1 is an aromatic heterocyclic ring or a ring-connected C4-C6 non-aromatic heterocyclic ring; and $R_1$ through $R_7$ are each independently hydrogen, a cyano group, —OR(R is a C1-C10 alkyl group or a C6-C20 aryl group), —C(=O)$R_a$, —C(=O)O$R_a$, —OCO(O$R_a$), —(X)$_n$—NH$_2$ (X is a C1-C10 alkyl group or a C1-C10 alkoxy group, n is an integer of 0 to 10), —C=N($R_a$), —S$R_a$, —S(=O)$R_a$, —S(=O)$_2R_a$, a substituted or non-substituted C1-C20 alkyl group, a substituted or non-substituted C1-C20 alkoxy group, a substituted or non-substituted C2-C20 alkenyl group, a substituted or non-substituted C2-C20 alkynyl group, a C2-C20 alkylene oxide group, a substituted or non-substituted C3-C30 cycloalkyl group, a substituted or non-substituted C6-C30 aryl group, a substituted or non-substituted C6-C30 aryloxy group, a substituted or non-substituted C6-C30 heteroaryl group, or combinations thereof, wherein $R_a$ is hydrogen, a C1-C10 alkyl group, or a C6-C20 aryl group and at least one of $R_1$ through $R_7$ includes a polar functional group selected from the group consisting of a cyano group, —OR(R is a C1-C10 alkyl group or a C6-C20 aryl group), —C(=O)$R_a$, —C(=O)O$R_a$, —OCO(O$R_a$), —(X)$_n$—NH$_2$ (X is a C1-C10 alkyl group or a C1-C10 alkoxy group, n is an integer of 0 to 10), —C=N($R_a$), —S$R_a$, —S(=O)$R_a$, and —S(=O)$_2R_a$.

The additive may be represented by Formula 2 below:

<Formula 2>

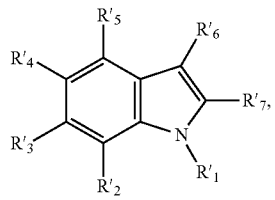

wherein $R'_1$ through $R'_7$ are each independently hydrogen, a cyano group, —OR(R is a C1-C10 alkyl group or a C6-C20 aryl group), —C(=O)$R_a$, —C(=O)O$R_a$, —(X)$_n$—NH$_2$ (X is a C1-C5 alkyl group or a C1-C5 alkoxy group, n is an integer of 0 to 5), —C=N($R_a$), —S$R_a$, —S(=O)$R_a$, —S(=O)$_2R_a$, a substituted or non-substituted C1-C20 alkyl group, a substituted or non-substituted C1-C20 alkoxy group, a substituted or non-substituted C2-C20 alkenyl group, a substituted or non-substituted C2-C20 alkynyl group, a substituted or non-substituted C3-C30 cycloalkyl group, a substituted or non-substituted C6-C30 aryl group, a substituted or non-substituted C6-C30 aryloxy group, a substituted or non-substituted C6-C30 heteroaryl group, or combinations thereof, wherein $R_a$ is hydrogen, a C1-C10 alkyl group, or a C6-C20 aryl group and at least one of $R'_1$ to $R'_7$ include a polar functional group selected from the group consisting of a cyano group, —OR(R is a C1-C10 alkyl group or a C6-C20 aryl group), —C(=O)$R_a$, —C(=O)O$R_a$, —OCO(O$R_a$), —(X)$_n$—NH$_2$ (X is a C1-C10 alkyl group or a C1-C10 alkoxy group, n is an integer of 0 to 10), —C=N($R_a$), —S$R_a$, —S(=O)$R_a$, and —S(=O)$_2R_a$.

At least one of the $R_1'$ to $R_7'$ may be —(CH$_2$)$_n$—NH$_2$ or —(CH$_2$O)$_n$—NH$_2$ (n is an integer of 1 to 5).

At least one of the $R'_1$ to $R'_7$ is S(=O)$_2$(C$_n$H$_{2n+1}$) (n is an integer of 1 to 5), —S(=O)$_2$C$_6$H$_5$ or —S(=O)$_2$CH$_2$C$_6$H$_5$.

The additive may be represented by Formula 3 below:

<Formula 3>

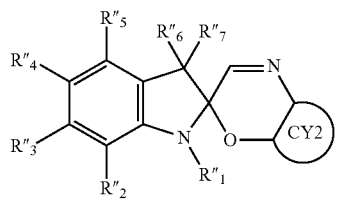

wherein CY2 is a ring selected from the group consisting of a benzene ring, a naphthalene ring, a phenanthrene ring, an anthracene ring, a pyrene ring, a perylene ring, a cyclopentane ring, a cycloheptane ring, and derivatives thereof; and $R''_1$ to $R''_7$ are each independently hydrogen, —OR(R is a C1-C10 alkyl group or a C6-C20 aryl group), —C(=O)$R_a$, —C(=O)O$R_a$, —(X)$_n$—NH$_2$ (X is a C1-C5 alkyl group or a C1-C5 alkoxy group, n is an integer of 0 to 5), —C=N($R_a$), —S$R_a$, —S(=O)$R_a$, —S(=O)$_2R_a$, a substituted or non-substituted C1-C20 alkyl group, a substituted or non-substituted C1-C20 alkoxy group, a substituted or non-substituted C2-C20 alkenyl group, a substituted or non-substituted C2-C20 alkynyl group, a substituted or non-substituted C3-C30 cycloalkyl group, a substituted or non-substituted C6-C30 aryl group, a substituted or non-substituted C6-C30 aryloxy group, a substituted or non-substituted C6-C30 het-eroaryl group, or combinations thereof, wherein $R_a$ is hydrogen, a C1-C10 alkyl group, or a C6-C20 aryl group.

The additive may include at least one selected from the group consisting of 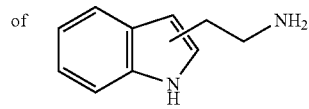

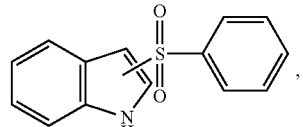

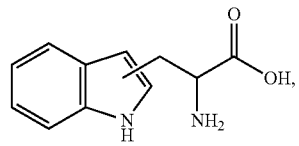

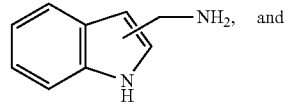 and

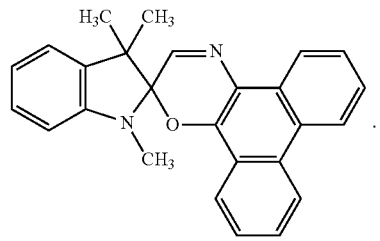

The additive may include at least one selected from a group consisting of

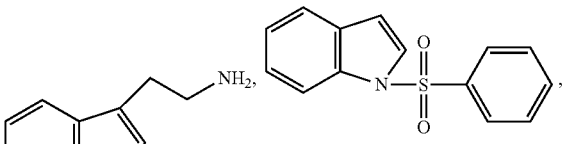

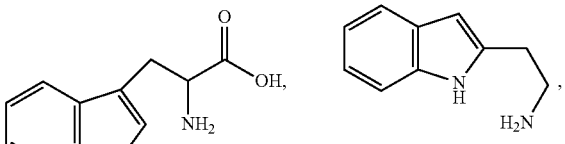

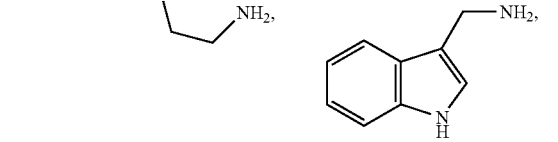

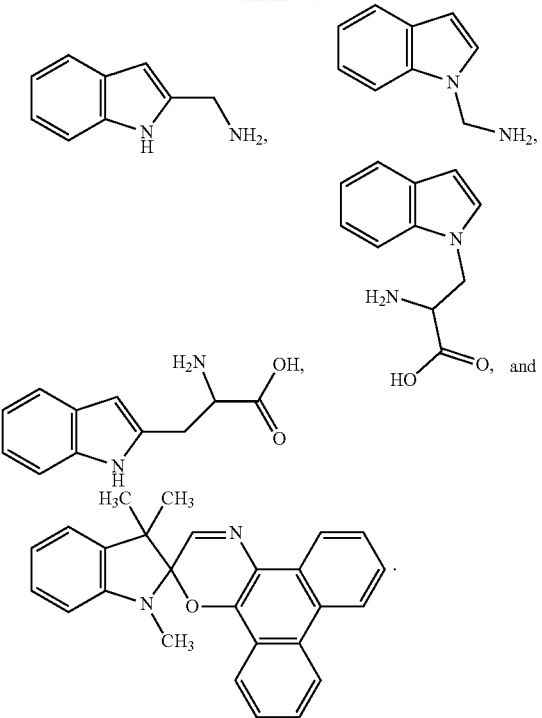

The amount of the additive may be in a range of from about 0.01 to about 10 wt % based on a total weight of the electrolyte.

The lithium salt may be, but is not limited to, $LiPF_6$, $LiBF_4$, $LiSbF_6$, $LiAsF_6$, $LiCF_3SO_3$, $Li(CF_3SO_2)_3C$, $Li(CF_3SO_2)_2N$, $LiC_4F_9SO_3$, $LiClO_4$, $LiAlO_4$, $LiAlCl_4$, $LiBPh_4$, $LiN(CF_{2x+1}SO_2)(C_xF_{2y+1}SO_2)$ (where x and y are natural numbers), LiCl, LiI, LIBOB (lithium bisoxalate borate), or combinations thereof.

The non-aqueous organic solvent may be a carbonate-based solvent, an ester-based solvent, an ether-based solvent, a ketone-based solvent, an alcohol-based solvent, a non-protonic solvent, or combinations thereof.

According to another aspect of the present invention, the lithium secondary battery includes a positive electrode including a positive active material capable of intercalating and deintercalating lithium ions, a negative electrode including a negative active material capable of intercalating and deintercalating lithium ions, and an electrolyte between the positive electrode and the negative electrode, wherein the electrolyte includes a lithium salt, a non-aqueous organic solvent, and an additive represented by Formula 1 below:

<[Formula 1]>

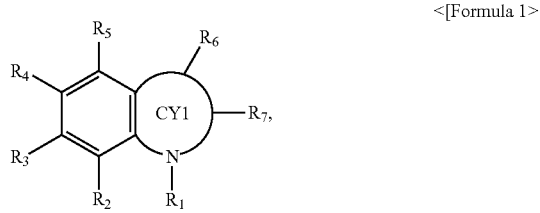

wherein CY1 is an aromatic heterocyclic ring or a ring-connected C4-C6 non-aromatic heterocyclic ring; and $R_1$ to $R_7$ are each independently hydrogen, a cyano group, —OR(R is a C1-C10 alkyl group or a C6-C20 aryl group), —C(=O)$R_a$, —C(=O)O$R_a$, —OCO(O$R_a$), —(X)$_n$—NH$_2$ (X is a C1-C10 alkyl group or a C1-C10 alkoxy group, n is an integer of 0 to 10), —C=N($R_a$), —S$R_a$, —S(=O)$R_a$, —S(=O)$_2R_a$, a substituted or non-substituted C1-C20 alkyl group, a substituted or non-substituted C1-C20 alkoxy group, a substituted or non-substituted C2-C20 alkenyl group, a substituted or non-substituted C2-C20 alkynyl group, a C2-C20 alkylene oxide group, a substituted or non-substituted C3-C30 cycloalkyl group, a substituted or non-substituted C6-C30 aryl group, a substituted or non-substituted C6-C30 aryloxy group, a substituted or non-substituted C6-C30 heteroaryl group, or combinations thereof, wherein $R_a$ is hydrogen, a C1-C10 alkyl group, or a C6-C20 aryl group and at least one of $R_1$ to $R_7$ includes a polar functional group selected from the group consisting of a cyano group, —OR(R is a C1-C10 alkyl group or a C6-C20 aryl group), —C(=O)$R_a$, —C(=O)O$R_a$, —OCO(O$R_a$), —(X)$_n$—NH$_2$ (X is a C1-C10 alkyl group or a C1-C10 alkoxy group, n is an integer of 0 to 10), —C=N($R_a$), —S$R_a$, —S(=O)$R_a$, and —S(=O)$_2R_a$.

The positive electrode includes a film formed on its surface, wherein the film is partially or wholly derived from the additive of the electrolyte.

The film may include an inorganic layer and an organic layer in a mixed form.

The thickness of the film may be in a range of from about 0.5 nm to about 100 nm.

The amount of the additive may be in a range of from about 0.01 to about 10 wt % based on a total weight of the electrolyte.

The positive active material may include $Li_{1+x}(M)_{1-x}O_2$ (0.05≤x≤0.2), wherein M may be a transition metal.

The positive active material may have an operating voltage of about 4.5V±0.5V.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
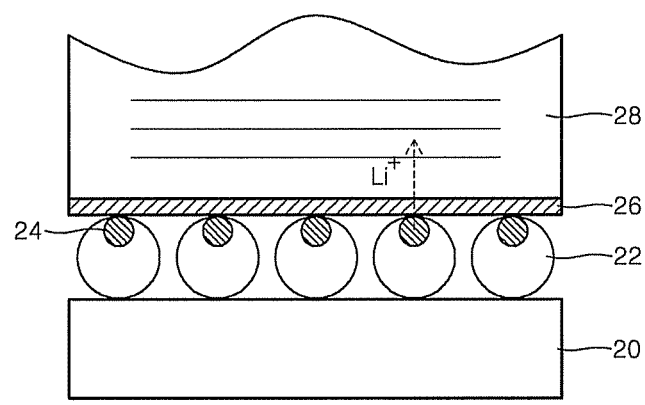
FIG. 1 is a schematic diagram illustrating that an SEI film is formed on a surface portion of a positive electrode when an additive for a lithium secondary battery according to an embodiment herein is added to an electrolyte.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Hereinafter, one or more embodiments of an electrolyte for a lithium secondary battery and a lithium secondary battery including the electrolyte will be described in detail. However, these embodiments are provided only for illustrative purposes and are not intended to limit the scope of the present invention.

According to an embodiment of the present disclosure, an electrolyte for a lithium secondary battery includes a lithium salt, a non-aqueous organic solvent, and an additive represented by Formula 1 below:

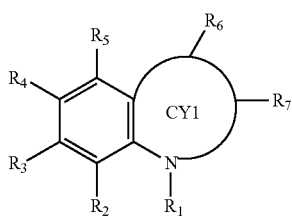
<Formula 1> wherein CY1 is an aromatic heterocyclic ring or a ring-connected C4-C6 non-aromatic heterocyclic ring; and $R_1$ through $R_7$ are each independently hydrogen, a cyano group, —OR(R is a C1-C10 alkyl group or a C6-C20 aryl group), —C(=O)$R_a$, —C(=O)O$R_a$, —OCO(O$R_a$), —(X)$_n$—NH$_2$ (X is a C1-C10 alkyl group or a C1-C10 alkoxy group, n is an integer of 0 to 10), —C=N($R_o$), —S$R_a$, —S(=O)$R_a$, —S(=O)$_2R_a$, a substituted or non-substituted C1-C20 alkyl group, a substituted or non-substituted C1-C20 alkoxy group, a substituted or non-substituted C2-C20 alkenyl group, a substituted or non-substituted C2-C20 alkynyl group, a C2-C20 alkylene oxide group, a substituted or non-substituted C3-C30 cycloalkyl group, a substituted or non-substituted C6-C30 aryl group, a substituted or non-substituted C6-C30 aryloxy group, a substituted or non-substituted C6-C30 heteroaryl group, or combinations thereof, wherein $R_a$ is hydrogen, a C1-C10 alkyl group, or a C6-C20 aryl group and at least one of $R_1$ to $R_7$ includes a polar functional group selected from the group consisting of a cyano group, —OR(R is a C1-C10 alkyl group or a C6-C20 aryl group), —C(=O) $R_a$, —C(=O)O$R_a$, —OCO(O$R_a$), —(X)$_n$—NH$_2$ (X is a C1-C10 alkyl group or a C1-C10 alkoxy group, n is an integer of 0 to 10), —C=N($R_a$), —S$R_a$, —S(=O)$R_a$, and —S(=O)$_2 R_a$.

The term "aromatic heterocyclic ring" used in Formula 1 refers to an aromatic compound including nitrogen atoms as well as carbon atoms. For example, the aromatic heterocyclic ring may be a C4-C20 aromatic heterocyclic ring, for example, a C4-C10 aromatic heterocyclic ring, for example, a C4-C6 aromatic heterocyclic ring.

The "aromatic heterocyclic ring" may be, for example, pyrrole, pyridine, or the like. For example, the "aromatic heterocyclic ring" may be pyrrole.

The "ring" in the term "ring-connected C4-C6 non-aromatic heterocyclic ring" of Formula 1 may be a ring selected from an aromatic ring, a cycloalkane ring, and derivatives thereof. For example, the "ring" in the term "ring-connected C4-C6 nonaromatic heterocyclic ring" of Formula 1 may be an aromatic ring or a cycloalkane ring, for example, an aromatic ring.

The additive of Formula 1 may be an indole compound or an indole derivative which has a resonance-structured benzene ring, a heterocyclic ring containing nitrogen atoms having non-covalent electron pairs, and a polar substituent.

The indole derivative compound includes nitrogen atoms having non-covalent electron pairs in the heterocyclic ring and the polar substituent having non-covalent electron pairs where the degree of electron-donating is relatively high, thereby facilitating an oxidation reaction at an initial stage of a charging process as compared to when the indole derivative compound includes a substituent, such as a halogen atom, a hydroxyl group, or a substituted or non-substituted C1-C6 alkoxy group. Accordingly, a thin and solid film will be formed on a surface of a positive electrode, thereby preventing oxidization of an electrolyte on the surface thereof. Also, since the indole derivative compound includes nitrogen atoms having non-covalent electron pairs in the heterocyclic ring and the polar substituent having non-covalent electron pairs where a degree of electron-donating is relatively high, there is provided a path for transferring lithium ions in the electrolyte. Thus, a lithium secondary battery including the electrolyte described above will have increased lifetime. The obtained film suppresses additional electrolyte side reactions and elution of metal ions even when the battery is exposed to a high temperature, thereby contributing to improved high temperature conservation characteristics and lifetime.

A definition of the term "the substituent (or substituted group)" in Formula 1 will be described below.

The term "substituted" used herein with respect to the above groups alkyl, alkoxy, alkenyl, alkynyl, alkylene oxide, cycloalkyl, aryl, aryloxy, and heteroaryl in Formula 1 refers to substitution with a halogen atom, a C1-C20 alkyl group substituted with a halogen atom (e.g., $CCF_3$, $CHCF_2$, $CH_2F$, $CCl_3$), a hydroxy group, a nitro group, a cyano group, an amino group, an amidino group, hydrazine, hydrazone, a carboxyl group or a salt thereof, a sulfonic acid group or a salt thereof, a phosphoric acid or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, or a C6-C20 heteroarylalkyl group.

Examples of the C1-C20 alkyl group used herein include methyl, ethyl, propyl, isobutyl, sec-butyl, ter-butyl, neo-butyl, iso-amyl, and hexyl. In this regard, at least one hydrogen atom of the alkyl group may be substituted with the same substituent as that defined with respect to the term 'substituted' above.

Examples of the C1-C20 alkoxy group used herein include methoxy, ethoxy, and propoxy. In this regard, at least one hydrogen atom of the alkoxy group may be substituted with the same substituent as that defined with respect to the term 'substituted' above.

Examples of the C2-C20 alkenyl group used herein include vinylene and allylene. In this regard, at least one hydrogen atom of the alkenyl group may be substituted with the same substituent as that defined with respect to the term 'substituted' above.

The C2-C20 alkynyl group used herein may be, for example, acetylene. In this regard, at least one hydrogen atom of the alkynyl group may be substituted with the same substituent as that defined with respect to the term 'substituted' above.

Examples of the C2-C20 alkylene oxide group used herein include ethylene oxide, propylene oxide, and butylene oxide. In this regard, at least one hydrogen atom of the alkylene oxide group may be substituted with the same substituent as that defined with respect to the term 'substituted' above.

Examples of the C3-C30 cycloalkyl group used herein include cyclopropyl, cyclobutyl, cyclopentyl, and cyclohexyl. In this regard, at least one hydrogen atom of the cycloalkyl group may be substituted with the same substituent as that defined with respect to the term 'substituted' above.

The C6-C30 aryl group used herein may be used alone or in combination, and refers to an aromatic system including at least one ring. For example, the C6-C30 aryl group may be phenyl and/or naphthyl. In this regard, at least one hydrogen atom of the aryl group may be substituted with the same substituent as that defined with respect to the term 'substituted' above.

The C6-C30 aryloxy group used herein may be phenoxy. In this regard, at least one hydrogen atom of the aryloxy group may be substituted with the same substituent as that defined with respect to the term 'substituted' above.

The C6-C30 heteroaryl group used herein refers to an organic compound including at least one hetero atom selected from the group consisting of N, O, P, and S, and the remainder atoms of carbon. For example, the C6-C30 heteroaryl group may be pyridyl. In this regard, at least one hydrogen atom of the heteroaryl group may be substituted with the same substituent as that defined with respect to the term 'substituted' above.

FIG. 1 is a schematic diagram illustrating that an SEI film 26 is formed on a surface portion of a positive electrode when an additive for a lithium secondary battery according to an embodiment is added to an electrolyte.

Referring to FIG. 1, when an additive of the electrolyte for a lithium secondary battery is used, the SEI film 26, which is thin and solid, is formed on a surface of the positive active material 22 as a surface portion of a positive electrode, and thus lithium ions 24 are effectively transferred from the positive electrode to an electrolyte 28.

In detail, nitrogen atoms having non-covalent electron pairs in a heterocyclic ring act as a reaction initiator to form a polymer with other additives including a polar substituent having non-covalent electron pairs with a relatively high electron-donating ability and with a non-aqueous organic solvent, and by using the polymer, the thin SEI film 26 with lithium ion conductivity is formed on the positive active material 22. In other words, the decomposition potential of the indole derivative compound is lower than that of the electrolyte, and thus the indole derivative compound is oxidized before the electrolyte is oxidized on a surface of the positive electrode, thereby forming a film. In addition, the indole derivative compound includes nitrogen atoms having non-covalent electron pairs in the heterocyclic ring and a polar substituent having non-covalent electron pairs with a relatively high electron-donating ability, thereby forming a path for smoothly transferring lithium ions in an electrolyte.

The additive may be represented by Formula 2 below:

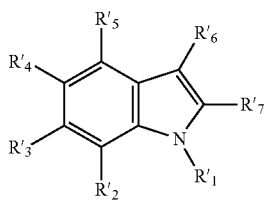

<Formula 2> wherein $R'_1$ through $R'_7$ are each independently hydrogen, a cyano group, —OR(R is a C1-C10 alkyl group or a C6-C20 aryl group), —C(=O)$R_a$, —C(=O)O$R_a$, —(X)$_n$—NH$_2$ (X is a C1-C5 alkyl group or a C1-C5 alkoxy group, n is an integer of 0 to 5), —C=N($R_a$), —S$R_a$, —S(=O)$R_a$, —S(=O)$_2R_a$, a substituted or non-substituted C1-C20 alkyl group, a substituted or non-substituted C1-C20 alkoxy group, a substituted or non-substituted C2-C20 alkenyl group, a substituted or non-substituted C2-C20 alkynyl group, a substituted or non-substituted C3-C30 cycloalkyl group, a substituted or non-substituted C6-C30 aryl group, a substituted or non-substituted C6-C30 aryloxy group, a substituted or non-substituted C6-C30 heteroaryl group, or combinations thereof, wherein $R_a$ is hydrogen, a C1-C10 alkyl group, or a C6-C20 aryl group and at least one of $R'_1$ through $R'_7$ includes a polar functional group selected from the group consisting of a cyano group, —OR(R is a C1-C10 alkyl group or a C6-C20 aryl group), —C(=O)$R_a$, —C(=O)O$R_a$, —OCO(O$R_a$), —(X)$_n$—NH$_2$ (X is a C1-C10 alkyl group or a C1-C10 alkoxy group, n is an integer of 0 to 10), —C=N($R_a$), —S$R_a$, —S(=O)$R_a$, and —S(=O)$_2R_a$.

The substituents used in Formula 2 are the same as defined in Formula 1.

The additive of Formula 2, which is an indole compound, includes a polar substituent having non-covalent electron pairs with a relatively high electron-donating ability, and thus is easily decomposed. Therefore, the additive is oxidized before the electrolyte is oxidized on a surface of a positive electrode, and thus a film will be formed within a short time.

At least one of $R'_1$ through $R'_7$ may be —(CH$_2$)$_n$—NH$_2$ or —(CH$_2$O)$_n$—NH$_2$ where n is an integer of 1 to 5.

For example, $R'_1$ through $R'_7$ may be each independently at least one of an aminomethyl group, an aminoethyl group, an aminopropyl group, an aminobutyl group, an aminopentyl group, an aminomethoxy group, an aminoethoxy group, an aminopropoxy group, an aminobutoxy group, and an aminopentoxy group.

At least one of $R'_1$ through $R'^7$ may be S(=O)$_2$(C$_n$H$_{2n+1}$) where n is an integer of 1 to 5, —S(=O)$_2$C$_6$H$_5$, or —S(=O)$_2$CH$_2$C$_6$H$_5$.

For example, $R'_1$ through $R'_7$ may be each independently at least one of a methylsulfonyl group, an ethylsulfonyl group, a propylsulfonyl group, a butylsulfonyl group, a pentylsulfonyl group, a phenylsulfonyl group, and a benzylsulfonyl group.

The additive may be represented by Formula 3 below:

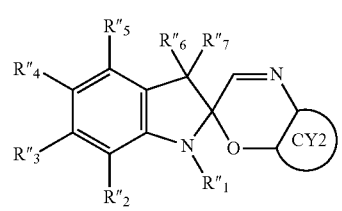

<Formula 3> wherein CY2 is a ring selected from the group consisting of a benzene ring, a naphthalene ring, a phenanthrene ring, an anthracene ring, a pyrene ring, a perylene ring, a cyclopentane ring, a cycloheptane ring, and derivatives thereof; and $R''_1$ to $R''_7$ are each independently hydrogen, a cyano group, —OR(R is a C1-C10 alkyl group or a C6-C20 aryl group), —C(=O)$R_a$, —C(=O)O$R_a$, —(X)$_n$—NH$_2$ (X is a C1-C5 alkyl group or a C1-C5 alkoxy group, n is an integer of 0 to 5), —C=N($R_a$), —S$R_a$, —S(=O)$R_a$, —S(=O)$_2R_a$, a substituted or non-substituted C1-C20 alkyl group, a substituted or non-substituted C1-C20 alkoxy group, a substituted or non-substituted C2-C20 alkenyl group, a substituted or non-substituted C2-C20 alkynyl group, a substituted or non-substituted C3-C30 cycloalkyl group, a substituted or non-substituted C6-C30 aryl group, a substituted or non-substituted C6-C30 aryloxy group, a substituted or non-substituted C6-C30 heteroaryl group, or combinations thereof, wherein $R_a$ is hydrogen, a C1-C10 alkyl group, or a C6-C20 aryl group.

The substituents used in Formula 3 are the same as defined in Formula 1.

The additive of Formula 3 is an indole derivative having a structure in which an oxazine ring containing a nitrogen atom and an oxygen atom and a polycyclic ring are fused with each other. For example, the polycyclic ring may be a ring selected from the group consisting of a benzene ring, a naphthalene ring, a phenanthrene ring, an anthracene ring, a pyrene ring, a perylene ring, a cyclopentane ring, a cycloheptane ring, and derivatives thereof. In particular, the polycyclic ring may be a polycyclic aromatic ring selected from the group consisting of a benzene ring, a naphthalene ring, a phenanthrene ring, an anthracene ring, a pyrene ring, and a perylene ring.

The polycyclic aromatic ring includes a large amount of resonance-structured stable benzene rings, and thus side reactions do not occur in molecules. Therefore, the polycyclic aromatic ring acts in a stable form and is easily decomposed so that the additive is oxidized before an electrolyte is oxidized on a surface of the positive electrode, and a film will be formed within a short time, accordingly.

For example, the additive may be at least one selected from the group consisting

For example, the additive may be at least one selected from the group consisting of

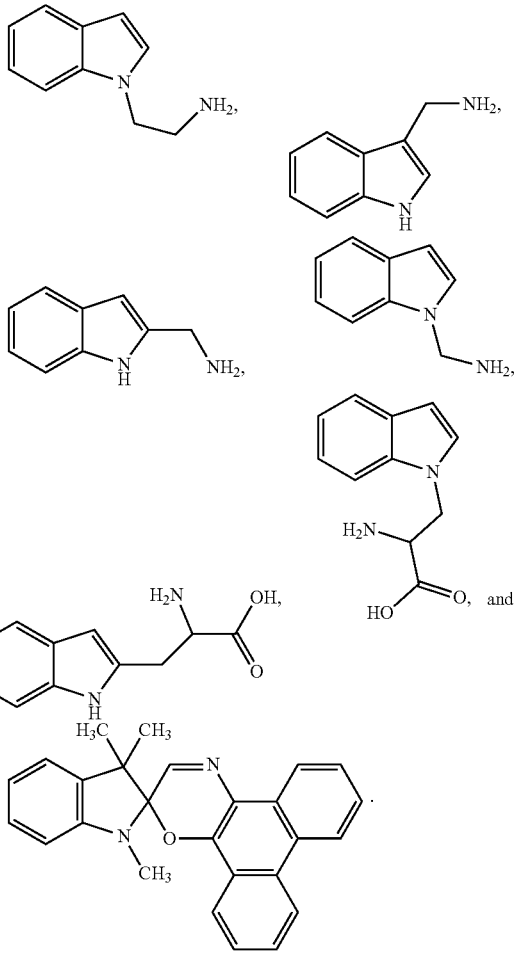

The amount of the additive may be in the range of about 0.01 to about 10 wt %, for example, about 0.01 to 5 wt %, for example, about 0.01 to 1 wt %, based on the total weight of the electrolyte.

If the amount of the additive is within the range described above, the additive is decomposed in an electrolyte so that a thin conductive film will be formed on a surface of a positive electrode in a state where side reactions of the electrolyte do not occur, whereby cycle lifetime characteristics of the lithium secondary battery will be improved.

The lithium salt may be, for example, $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_6SO_3$, $LiClO_4$, $LiAlO_4$, $LiAlCl_4$, $LiN(C_xF_{2x+1}SO_2)(C_xF_{2m}SO_2)$ where x and y are natural numbers, LiCl, LiI, lithium bisoxalate borate, or combinations thereof.

The lithium salt used in the electrolyte for a lithium secondary battery is dissolved in an organic solvent and acts as a lithium-ion source, thereby enabling basic operation of a lithium secondary battery, and promoting transfer of lithium ions between the positive electrode and the negative electrode. The lithium salt may be any one of the materials that are conventionally used in a lithium battery.

The lithium salt may also be used as a supporting electrolytic salt.

The concentration of the lithium salt may be within a concentration range generally used in the art. For example, the concentration of the lithium salt in the electrolyte may be in the range of about 0.1 to about 2.0 M. If the concentration of the lithium salt is within the range described above, the concentration of the electrolyte will be appropriately maintained to improve performance of the electrolyte and the viscosity of the electrolyte will be appropriately maintained to improve mobility of lithium ions.

Examples of the non-aqueous organic solvent include a carbonate-based solvent, an ester-based solvent, an ether-based solvent, a ketone-based solvent, an alcohol-based solvent, a non-protonic solvent, or combinations thereof.

The non-aqueous organic solvent included in the electrolyte may act as a medium through which ions participating in an electrochemical reaction of a battery can migrate. The non-aqueous organic solvent may be any one of various materials that are generally used in the art.

Examples of the carbonate-based solvent include dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC), and butylene carbonate (BC). Examples of the ester-based solvent include methyl acetate, ethyl acetate, n-propyl acetate, dimethyl acetate, methyl propionate, ethyl propionate, γ-butyrolactone, decanolide, valerolactone, mevalonolactone, and caprolactone. Examples of the ether-based solvent include dibutyl ether, tetraglyme, diglyme, dimethoxyethane, 2-methyl tetrahydrofuran, and tetrahydrofuran. An example of the ketone-based solvent is cyclohexanone.

Examples of the alcohol-based solvent include ethyl alcohol and isopropyl alcohol. Examples of the non-protonic solvent include nitriles represented by R—CN where R is a linear, branched, or cyclic hydrocarbonyl group having 2 to 20 carbon atoms, and R may have a double bond aromatic ring or an ether bond; amides such as dimethyl formamide; dioxolanes such as 1,3-dioxolane; and sulfolanes.

The non-aqueous organic solvents may be used alone or more than two kinds thereof in combination. If more than two kinds of the non-aqueous organic solvents are used in combination, a mixed volume ratio may be appropriately adjusted according to the desired performance of the battery to be manufactured and will be obvious to one of ordinary skill in the art.

Also, if the carbonate-based solvent is used, a cyclic carbonate and a linear chain carbonate may be used in combination. In this case, the volumetric ratio of the cyclic carbonate to the linear chain carbonate may be in the range of about 1:1 to about 1:9. If the volumetric ratio of the cyclic carbonate to the chain carbonate is within this range, an electrolyte including the carbonate-based solvent has good performance.

The non-aqueous organic solvent may further include, in addition to the carbonate-based solvent, an aromatic hydrocarbon-based organic solvent. In this regard, the carbonate-based solvent may be mixed with the aromatic hydrocarbon-based organic solvent in a volumetric ratio of about 1:1 to about 30:1.

The aromatic hydrocarbon-based organic solvent may be an aromatic hydrocarbon-based compound represented by Formula 4 below:

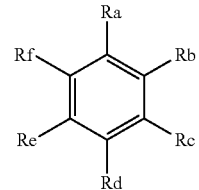

<Formula 4> wherein $R_a$ through $R_f$ are each independently hydrogen, a halogen atom, a C1 to C10 alkyl group, a haloalkyl group, or combinations thereof.

Examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

A lithium secondary battery including the electrolyte described above will now be described in detail.

According to another embodiment of the present disclosure, a lithium secondary battery includes a positive electrode including a positive active material into or from which lithium ions are intercalated or deintercalated; a negative electrode including a negative active material into or from which lithium ions are intercalated or deintercalated; and an electrolyte interposed between the positive electrode and the negative electrode, wherein the electrolyte includes a lithium salt, a non-aqueous organic solvent, and an additive represented by Formula 1 below:

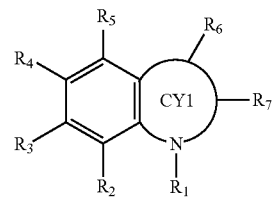

<Formula 1> wherein CY1 is an aromatic heterocyclic ring or a ring-connected C4-C6 non-aromatic heterocyclic ring; and $R_1$ to $R_7$ are each independently hydrogen, a cyano group, —OR(R is a C1-C10 alkyl group or a C6-C20 aryl group), —C(=O)$R_a$, —C(=O)O$R_a$, —OCO(O$R_a$), —(X)$_n$—NH$_2$ (X is a C1-C10 alkyl group or a C1-C10 alkoxy group, n is an integer of 0 to 10), —C=N($R_a$), —S$R_a$, —S(=O)$R_a$, —S(=O)$_2R_a$, a substituted or non-substituted C1-C20 alkyl group, a substituted or non-substituted C1-C20 alkoxy group, a substituted or non-substituted C2-C20 alkenyl group, a substituted or non-substituted C2-C20 alkynyl group, a C2-C20 alkylene oxide group, a substituted or non-substituted C3-C30 cycloalkyl group, a substituted or non-substituted C6-C30 aryl group, a substituted or non-substituted C6-C30 aryloxy group, a substituted or non-substituted C6-C30 heteroaryl group, or combinations thereof, wherein $R_a$ is hydrogen, a C1-C10 alkyl group, or a C6-C20 aryl group and at least one of $R_1$ to $R_7$ includes a polar functional group selected from the group consisting of a cyano group, —OR(R is a C1-C10 alkyl group or a C6-C20 aryl group), —C(=O)$R_a$, —C(=O)O$R_a$, —OCO(O$R_a$), —(X)$_n$—NH$_2$ (X is a C1-C10 alkyl group or a C1-C10 alkoxy group, n is an integer of 0 to 10), —C=N($R_a$), —S$R_a$, —S(=O)$R_a$, and —S(=O)$_2R_a$ The term 'aromatic heterocyclic ring' used in Formula 1 refers to an aromatic compound including nitrogen atoms as well as carbon atoms. For example, the aromatic heterocyclic ring may be a C4-C20 aromatic heterocyclic ring, for example, a C4-C10 aromatic heterocyclic ring, for example, a C4-C6 aromatic heterocyclic ring.

The "aromatic heterocyclic ring" may be, for example, pyrrole, pyridine, or the like. For example, the "aromatic heterocyclic ring" may be pyrrole.

The "ring" in the term "ring-connected C4-C6 non-aromatic heterocyclic ring" of Formula 1 may be a ring selected from an aromatic ring, a cycloalkane ring, and derivatives thereof. For example, the "ring" in the term "ring-connected C4-C6 non-aromatic heterocyclic ring" of Formula 1 may be an aromatic ring or a cycloalkane ring, for example, an aromatic ring.

The additive of Formula 1 may be an indole compound or an indole derivative which has a resonance-structured benzene ring, a heterocyclic ring containing nitrogen atoms having non-covalent electron pairs, and a polar substituent.

The lithium secondary battery including the electrolyte includes the additive of Formula 1. The additive of Formula 1 is an indole derivative compound and includes a nitrogen atom having non-covalent electron pairs in the heterocyclic ring and a specific polar substituent having non-covalent electron pairs with a relatively high electron-donating ability, thereby facilitating an oxidation reaction in an initial stage of a charging process as compared to when an additive including a substituent such as a halogen atom, a hydroxyl group, and a substituted or unsubstituted alkoxy group is used. Therefore, a thin, solid film is formed on a surface of the positive electrode, thereby preventing oxidization of the electrolyte on the surface of the positive electrode. In addition, since the indole derivative compound includes nitrogen atoms having non-covalent electron pairs in the heterocyclic ring and a polar substituent having non-covalent electron pairs with a relatively high electron-donating ability, there is provided a path for transferring lithium ions in the electrolyte. Thus, a lithium secondary battery including the electrolyte described above will have increased lifetime characteristics. The film formed on the surface of the positive electrode suppresses additional electrolyte side reactions and elution of metal ions even when the battery is exposed to a high temperature, thereby contributing to improved high temperature conservation characteristics and lifetime.

When a battery with improved high-temperature lifetime characteristics is used in an electric vehicle, the battery makes it possible for the electric vehicle to endure harsh environments, and the improvement in high-temperature conservation characteristics makes the battery including the electrolyte more suitable for power storage applications that are likely to be exposed to high temperature.

The electrolyte may include an additive represented by Formula 2 below:

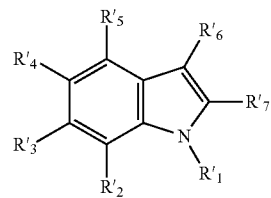

<Formula 2> wherein $R'_1$ to $R'_7$ are each independently hydrogen, a cyano group, —OR(R is a C1-C10 alkyl group or a C6-C20 aryl group), —C(=O)$R_a$, —C(=O)O$R_a$, —(X)—NH$_2$ (X is a C1-C5 alkyl group or a C1-C5 alkoxy group, n is an integer of 0 to 5), —C=N($R_a$), —S$R_a$, —S(=O)$R_a$, —S(=O)$_2R_a$, a substituted or non-substituted C1-C20 alkyl group, a substituted or non-substituted C1-C20 alkoxy group, a substituted or non-substituted C2-C20 alkenyl group, a substituted or non-substituted C2-C20 alkynyl group, a substituted or non-substituted C3-C30 cycloalkyl group, a substituted or non-substituted C6-C30 aryl group, a substituted or non-substituted C6-C30 aryloxy group, a substituted or non-substituted C6-C30 heteroaryl group, or combinations thereof, wherein $R_a$ is hydrogen, a C1-C10 alkyl group, or a C6-C20 aryl group and at least one of $R'_1$ through $R'_7$ includes a polar functional group selected from the group consisting of a cyano group, —OR(R is a C1-C10 alkyl group or a C6-C20 aryl group), —C(=O)$R_a$, —C(=O)O$R_a$, —OCO(O$R_a$), —(X)$_a$—NH$_2$ (X is a C1-C10 alkyl group or a C1-C10 alkoxy group, n is an integer of 0 to 10), —C=N($R_a$), —S$R_a$, —S(=O)$R_a$, and —S(=O)$_2R_a$ The substituents used in Formula 2 are the same as defined in Formula 1.

The additive of Formula 2 is an indole compound having a polar substituent, and includes a specific polar substituent having non-covalent electron pairs with a relatively high electron-donating ability, and thus is easily decomposed. Therefore, the additive is oxidized before an electrolyte is oxidized on a surface of a positive electrode, and thus a film will be formed within a short time. Thus, in a lithium secondary battery including the electrolyte containing the additive of Formula 2, additional reactions of the electrolyte on a surface of a positive electrode will be suppressed and elution of metal ions in a positive electrode material is prevented, whereby the lithium secondary battery will have improved high-temperature lifetime characteristics and high-temperature conservation characteristics.

At least one of $R'_1$ through $R'_7$ may be —(CH$_2$), —NH$_2$ or —(CH$_2$O)$_n$—NH$_2$ where n is an integer of 1 to 5.

For example, $R'_1$ through $R'_7$ may be each independently at least one of an aminomethyl group, an aminoethyl group, an aminopropyl group, an aminobutyl group, an aminopentyl group, an aminomethoxy group, an aminoethoxy group, an aminopropoxy group, an aminobutoxy group, and an aminopentoxy group.

At least one of $R'_1$ through $R'_7$ may be S(=O)$_2$(C$_n$H$_{2n+1}$) where n is an integer of 1 to 5, —S(=O)$_2$C$_6$H$_5$, or —S(=O)$_2$CH$_2$C$_6$H$_5$.

For example, $R'_1$ through $R'_7$ may be each independently at least one of a methylsulfonyl group, an ethylsulfonyl group, a propylsulfonyl group, a butylsulfonyl group, a pentylsulfonyl group, a phenylsulfonyl group, and a benzylsulfonyl group.

The electrolyte may include an additive represented by Formula 3 below:

<Formula 3>

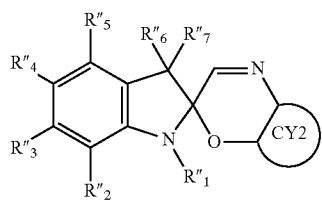

wherein CY2 is a ring selected from the group consisting of a benzene ring, a naphthalene ring, a phenanthrene ring, an anthracene ring, a pyrene ring, a perylene ring, a cyclopentane ring, a cycloheptane ring, and derivatives thereof; and R"$_1$ through R"$_7$ are each independently hydrogen, a cyano group, —OR(R is a C1-C10 alkyl group or a C6-C20 aryl group), —C(=O)R$_a$, —C(=O)OR$_a$, —(X)$_n$—NH$_2$ (X is a C1-C5 alkyl group or a C1-C5 alkoxy group, n is an integer of 0 to 5), —C=N(R$_a$), —SR$_a$, —S(=O)$_2$R$_a$, a substituted or non-substituted C1-C20 alkyl group, a substituted or non-substituted C1-C20 alkoxy group, a substituted or non-substituted C2-C20 alkenyl group, a substituted or non-substituted C2-C20 alkynyl group, a substituted or non-substituted C3-C30 cycloalkyl group, a substituted or non-substituted C6-C30 aryl group, a substituted or non-substituted C6-C30 aryloxy group, a substituted or non-substituted C6-C30 heteroaryl group, or combinations thereof, wherein R$_a$ is hydrogen, a C1-C10 alkyl group, or a C6-C20 aryl group.

The substituents used in Formula 3 are the same as defined in Formula 1.

The additive of Formula 3 is an indole derivative having a structure in which an oxazine ring containing a nitrogen atom and an oxygen atom and a polycyclic ring are fused together. For example, the polycyclic ring may be a ring selected from the group consisting of a benzene ring, a naphthalene ring, a phenanthrene ring, an anthracene ring, a pyrene ring, a perylene ring, a cyclopentane ring, a cycloheptane ring, and derivatives thereof. In particular, the polycyclic ring may be a polycyclic aromatic ring selected from the group consisting of a benzene ring, a naphthalene ring, a phenanthrene ring, an anthracene ring, a pyrene ring, and a perylene ring.

The polycyclic aromatic ring includes a large number of resonance-structured stable benzene rings, and thus side reactions do not occur in molecules. Therefore, the polycyclic aromatic ring acts in a stable form and is easily decomposed so that the additive is oxidized before the electrolyte is oxidized on a surface of the positive electrode, and a film will be formed within a short time, accordingly. Thus, in a lithium secondary battery including the electrolyte containing the additive of Formula 3, additional reactions of the electrolyte on a surface of a positive electrode will be suppressed and elution of metal ions in a positive electrode material will be prevented, whereby the lithium secondary battery will have improved high-temperature lifetime characteristics and high-temperature conservation characteristics.

For example, the additive may be at least one selected from the group consisting of

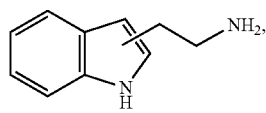

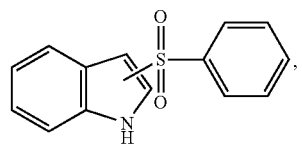

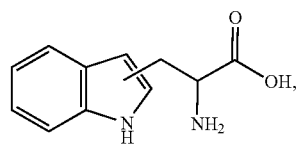

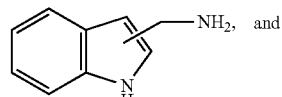

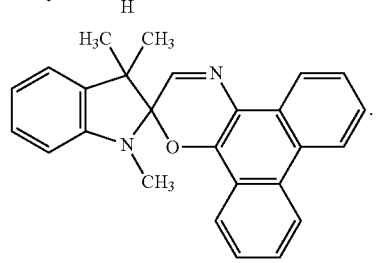

For example, the additive may be at least one selected from the group consisting of

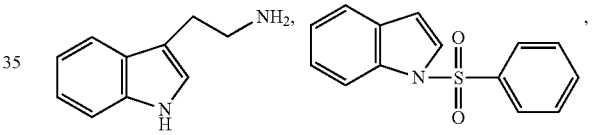

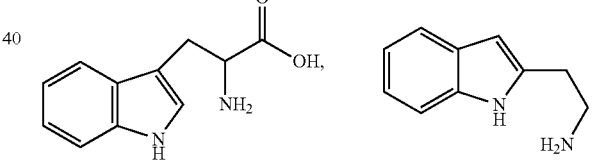

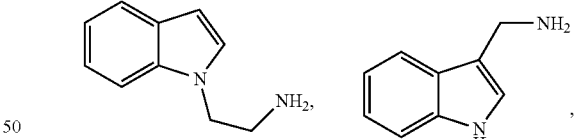

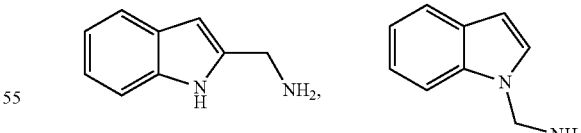

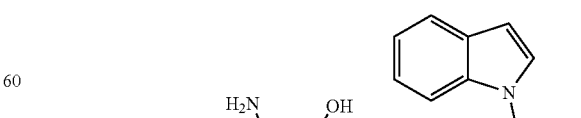

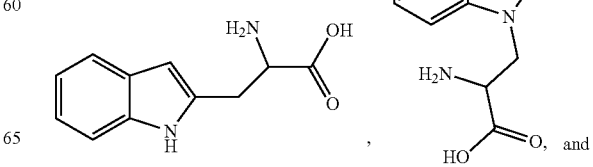

-continued

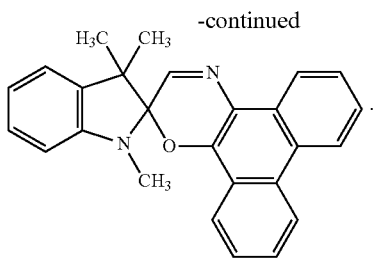

According to another embodiment of the present invention, a lithium secondary battery includes a positive electrode, a negative electrode, and an electrolyte, wherein the electrolyte includes a lithium salt, a non-aqueous organic solvent, and an additive represented by Formula 1 above, and the positive electrode includes a film formed on its surface, wherein the film is partially or wholly derived from the additive in the electrolyte.

The film may be formed in a polymer or monomer form such that nitrogen atoms of the indole derivative compound, which is the additive of Formula 1, are combined with nitrogen or carbon atoms of another indole derivative compound having a polar substituent that has high electrical energy and a relatively high electron-donating ability or combined with carbon atoms of a non-aqueous organic solvent, e.g., a carbonate-based solvent.

Alternatively, the film may be formed in a form of partially broken bonds of the indole derivative compound.

The film may include an organic layer and an inorganic layer in a mixed form.

Thus, even when the lithium secondary battery is charged at a high voltage (e.g., greater than 4.3 V), the lithium secondary battery has excellent capacity retention characteristics.

In addition, when the lithium secondary battery operates at high temperatures, the secondary lithium battery has excellent lifetime characteristics and excellent capacity conservation characteristics.

The thickness of the film may be in the range of about 0.5 nm to about 100 nm, for example, about 0.1 nm to about 80 nm, for example, about 0.5 nm to 50 nm.

When the thickness of the film formed on a surface of the positive electrode of the lithium secondary battery is within the range described above, the film will not adversely affect migration of lithium ions and oxidation of the electrolyte on the surface of the positive electrode will be effectively prevented.

The amount of the additive may be in the range of about 0.01 to about 10 wt %, for example, about 0.01 to 5 wt %, for example, about 0.01 to 1 wt %, based on the total weight of the electrolyte.

In the case where the amount of the additive is within the range described above, the additive is decomposed in the electrolyte so that a thin conductive film will be formed on a surface of the positive electrode in a state where side reactions of the electrolyte are repressed, and whereby cycle lifetime characteristics of the lithium secondary battery are improved.

Figure 2:
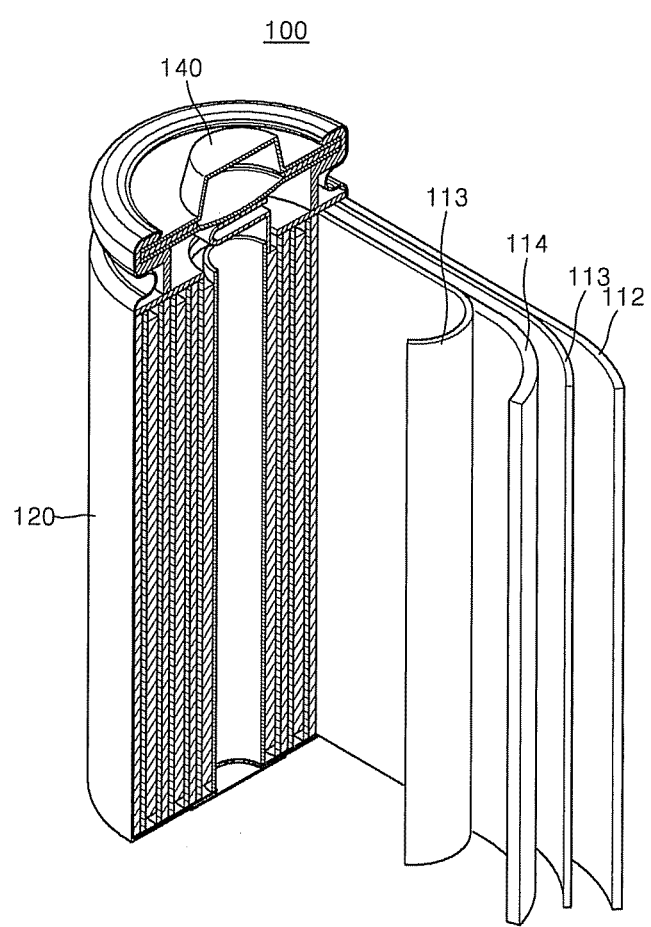
FIG. 2 is an exploded perspective view of a lithium secondary battery according to an embodiment herein.

FIG. 2 is an exploded perspective view of a lithium secondary battery 100 according to an embodiment. The lithium secondary battery of FIG. 2 is cylindrical, but the shape of the lithium secondary battery is not limited thereto. For example, the lithium secondary battery may have a rectangular shape or a pouch shape.

Lithium secondary batteries can be classified as a lithium ion battery, a lithium ion polymer battery, or a lithium polymer battery, according to the separator and the electrolyte; can be classified as a cylindrical battery, a rectangular battery, a coin-type battery, or a pouch-type battery, according to the shape of a battery; and can be classified as a bulk-type battery or a film-type battery, according to the size of the battery. The type of a lithium secondary battery according to an embodiment of the present disclosure is not limited. The structures and preparation methods of the batteries described above are known in the art and thus, will not be described in detail herein.

Referring to FIG. 2, the lithium secondary battery 100 is cylindrical, and includes a negative electrode 112, a positive electrode 114, a separator 113 interposed between the negative electrode 112 and the positive electrode 114, an electrolyte (not shown) with which the negative electrode 112, the positive electrode 114, and the separator 113 are impregnated, a battery container 120, and an encapsulation member 140 for encapsulating the battery container 120. The negative electrode 112, the positive electrode 114, and the separator 113 are sequentially deposited and then wound in a spiral form and then, the wound structure is placed in the battery container 120, thereby manufacturing the lithium secondary battery 100.

The negative electrode 112 includes a current collector and a negative active material layer formed on the current collector, wherein the negative active material layer includes a negative active material.

As a current collector for the negative electrode, according to the voltage range, a copper, nickel, or SUS current collector may be used. For example, a copper current collector may be used as a current collector for the negative electrode.

The negative active material may be any material that is generally used in the art. For example, examples of the negative active material include lithium metal, a metal material that is alloyable with lithium, a transition metal oxide, a material for doping or undoping lithium, and a material for reversibly intercalating or deintercalating lithium ions.

Examples of the transition metal oxide include vanadium oxide, lithium vanadium oxide, and the like. Examples of the material for doping or undoping lithium include Si; $SiO_x$ (0<x<2); Si—Y alloy where Y is an alkali metal, an alkali earth metal, a Group XIII element, a Group XIV element, a Group XV element, a Group XVI element, a transition metal, a rare-earth element, or combinations thereof and is not Si; Sn; $SnO_2$; and Sn—Y where Y is an alkali metal, alkali earth metal, a Group XIII element, a Group XIV element, a Group XV element, a Group XVI element, a transition metal, a rare-earth element, and combinations thereof and is not Sn. Also, at least one of the materials for doping or undoping lithium may be used in combination with $SiO_2$. The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or combinations thereof.

The material for reversibly intercalating or deintercalating lithium ions may be any one of various carbonaceous negative active materials that are generally used in a lithium ion secondary battery. Examples of the material for reversibly intercalating or deintercalating lithium include crystalline carbon, amorphous carbon, and combinations thereof. Examples of the crystalline carbon include natural graphite and artificial graphite, each of which has an amorphous shape, a plate shape, a flake shape, a spherical shape, or a fiber shape. Examples of the amorphous carbon include soft carbon (low-temperature calcined carbon), hard carbon, meso-phase pitch carbide, and calcined coke.

The negative active material layer may also include a binder, and may further selectively include a conductive agent.

The binder allows negative active material particles to be adhered to each other and the negative active material to be attached to the current collector. Examples of the binder include, but are not limited to polyvinylalcohol, carboxymethylcellulose, hydroxypropylcellulose, diacetylcellulose, polyvinylchloride, carboxylated polyvinylchloride, polyvinylfluoride, ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, and nylon.

The conductive agent provides conductivity to electrodes, and may be any one of various materials that do not cause any chemical change in the lithium secondary battery 100 and are electronically conductive. For example, the conductive agent may be natural graphite, artificial graphite, carbon black, acetylene black, ketjen black, carbon fiber, and metal powder or fiber of copper, nickel, aluminum, or silver. Also, conductive materials such as polyphenylene derivatives may be used in combination. Examples of the current collector include a copper foil, a nickel foil, a stainless steel foil, a titanium foil, nickel foam, copper foam, a polymer substrate coated with a conductive metal, and combinations thereof.

Amounts of the negative active material, the binder, and the conductive agent may be used at the same levels as commercially used in a lithium secondary battery. For example, the weight ratio of the negative active material to the sum of the conductive agent and the binder may be in the range of about 98:2 to about 92:8, and the mixed weight ratio of the conductive agent and the binder may be in the range of about 1:1.5 to about 1:3. However, the ratios are not limited to the above examples.

The positive electrode 114 includes a current collector and a positive active material layer formed on the current collector.

The current collector may be formed of, but not limited to Al.

The positive active material may be any one of various materials that are generally used in the art. For example, the positive active material may be a compound that enables reversible intercalation and deintercalation of lithium ions. The positive active material may include one or more composite oxides of lithium and a metal selected from the group consisting of cobalt, manganese, nickel, and combinations thereof. For example, the positive active material may be a compound represented by any one of Formulae: $Li_aA_{1-b}B_bD_2$ where $0.90 \leq a \leq 1.8$ and $0 \leq b \leq 0.5$; $Li_aE_{1-b}B_bO_{2-c}D_c$ where $0.90 \leq a \leq 1.8$, $0 \leq b \leq 0.5$, and $0 \leq c \leq 0.05$; $LiE_{2-b}B_bO_{4-c}D_e$ where $0 \leq b \leq 0.5$ and $0 \leq C \leq 0.05$; $Li_aNi_{1-b-c}Co_bB_cD_\alpha$ where $0.90 \leq a \leq 1.8$, $0 \leq b \leq 0.5$, $0 \leq C \leq 0.05$, and $0 < \alpha \leq 2$; $Li_aNi_{1-b-c}Co_bB_cO_2D_\alpha$ where $0.90 \leq a \leq 1.8$, $0 \leq b \leq 0.5$, $0 \leq c \leq 0.05$, and $0 < \alpha < 2$; $Li_aNi_{1-b-c}CO_bB_cO_{2-\alpha}F_2$ where $0.90 \leq a \leq 1.8$, $0 \leq b \leq 0.5$, $0 \leq c \leq 0.05$, and $0 < \alpha < 2$; $Li_aNi_{1-b-c}Mn_bB_cD_\alpha$ where $0.90 \leq a \leq 1.8$, $0 \leq b \leq 0.5$, $0 \leq c \leq 0.05$, and $0 < \alpha \leq 2$; $Li_aNi_{1-b-c}Mn_bB_cO_{2-\alpha}F_\alpha$ where $0.90 \leq a \leq 1.8$, $0 \leq b \leq 0.5$, $0 \leq c \leq 0.05$, and $0 < \alpha < 2$; $Li_aNi_{1-b-c}Mn_bB_cO_{2-\alpha}F_2$ where $0.90 \leq a \leq 1.8$, $0 \leq b \leq 0.5$, $0 \leq c \leq 0.05$, and $0 < \alpha < 2$; $Li_aNi_bE_cG_dO_2$ where $0.90 \leq a \leq 1.8$, $0 \leq b \leq 0.9$, $0 \leq c \leq 0.5$, and $0.001 \leq d \leq 0.1$; $Li_aNi_bCo_cMn_dGeO_2$ where $0.90 \leq a \leq 1.8$, $0 \leq b \leq 0.9$, $0 \leq c \leq 0.5$, $d \leq 0.5$, and $0.001 \leq e \leq 0.1$; $Li_aNiG_bO_2$ where $0.90 \leq a \leq 1.8$ and $0.001 \leq b \leq 0.1$; $Li_aCoG_bO_2$ wherein $0.90 \leq a \leq 1.8$ and $0.001 \leq b \leq 0.1$; $Li_aMnG_bO_2$ where $0.90 \leq a \leq 1.8$ and $0.001 \leq b \leq 0.1$; $Li_aMn_2G_bO_4$ where $0.90 \leq a \leq 1.8$ and $0.001 \leq b \leq 0.1$; $QO_2$; $QS_2$; $LiQS_2$; $V_2O_5$; $LiV_2O_5$; $LiIO_2$; $LiNiVO_4$; $Li_{(3-f)}J_2(PO_4)_3$ where $0 \leq f \leq 2$; $Li_{(3-f)}Fe_2(PO_4)_3$ where $0 \leq f \leq 2$; and $LiFePO_4$.

Examples of the positive active material include $LiMn_2O_4$, $LiNi_2O_4$, $LiCoO_2$, $LiMnO_2$, $Li_2MnO_3$, $LiFePO_4$, and $LiNi_xCo_yO_2$ where $0 < x \leq 0.15$ and $0 < y \leq 0.85$.

In particular, the positive active material may be $Li_{1+x}(M)_{1-x}O_2 (0.05 \leq x \leq 0.2)$ where M is a transition metal. Examples of the transition metal include, but are not limited to, Ni, Co, Mn, Fe, and Ti.

Since the weight ratio of lithium ions to the transition metal M is large in the positive active material, the capacity of a lithium secondary battery including a positive electrode including the positive active material will be improved.

In the formulae above, A is Ni, Co, Mn, or combinations thereof; B is Al, Ni, Co, Mn, Cr, Fe, Mg, Sr, V, a rare-earth element, or combinations thereof; D is O, F, S, P, or combinations thereof; E is Co, Mn, or combinations thereof; F is F, S, P, or combinations thereof; G is Al, Cr, Mn, Fe, Mg, La, Ce, Sr, V, or combinations thereof; Q is Ti, Mo, Mn, or combinations thereof; I is Cr, V, Fe, Sc, Y, or combinations thereof; and J is V, Cr, Mn, Co, Ni, Cu, or combinations thereof.

The compounds described above may have a coating layer on their surfaces. Alternatively, the compounds may instead be used in combination with a compound including a coating layer. The coating layer may include a coating element compound, such as an oxide of a coating element, a hydroxide of a coating element, an oxyhydroxide of a coating element, an oxycarbonate of a coating element, or a hydroxy carbonate of a coating element. The coating element compounds may be amorphous or crystalline. The coating element included in the coating layer may be Mg, Al, Co, K, Na, Ca, Si, Ti, V, Sn, Ge, Ga, B, As, Zr, or mixtures thereof. A coating layer may be formed by using the coating elements in the aforementioned compounds by using any one of various methods that do not adversely affect physical properties of the positive active material (e.g., spray coating or immersion). The coating layer formation methods will be obvious to one of ordinary skill in the art and thus, will not be described in detail.

The positive active material layer may further include a binder and a conductive agent.

The operating potential of the positive active material may be $4.5V \pm 0.5$ V.

The binder may allow positive active material particles to be adhered to each other and the positive active material to be attached to the current collector. Examples of the binder include, but are not limited to polyvinylalcohol, carboxymethylcellulose, hydroxypropylcellulose, diacetylcellulose, polyvinylchloride, carboxylated polyvinylchloride, polyvinylfluoride, ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, and nylon.

The conductive agent provides conductivity to the electrodes, and may be any one of various materials that do not cause any chemical change in the lithium secondary battery 100 and are electronically conductive. For example, the conductive agent may be natural graphite, artificial graphite, carbon black, acetylene black, ketjen black, carbon fiber, or metal powder or fiber of copper, nickel, aluminum, or silver. Also, a conductive material such as polyphenylene derivatives may be used alone or in combination of at least one of the conductive materials.

Amounts of the positive active material, the binder, and the conductive agent may be used at the same levels as commercially used in a lithium secondary battery. For example the weight ratio of the positive active material to the sum of the conductive agent and the binder may be in the range of about 98:2 to about 92:8, and the mixed weight ratio of the conductive agent to the binder may be in the range of about 1:1.5 to about 1:3. However, the mixed weight ratios are not limited to the above examples.

In order to form an electrode such as the negative electrode 112 and the positive electrode 114, an active material, a binder, and a conductive agent are mixed in a solvent to prepare an active material composition and a current collector is applied with the active material composition. This electrode manufacturing method is known in the art and, thus, will not be described in details herein. The solvent may be N-methylpyrrolidone, but is not limited thereto.

According to the type of lithium secondary battery contemplated, a separator may be interposed between the negative electrode and the positive electrode. The separator may be a single layer of polyethylene, polypropylene, or polyvinylidene fluoride, or multiple layers of at least two of these materials. Also, the separator may be a mixed multi-layer, such as a polyethylene/polypropylene layer, a polyethylene/polypropylene/polyethylene layer, or a polypropylene/polyethylene/polypropylene layer.

One or more embodiments will now be described in further detail with reference to the following examples. These examples are for illustrative purposes only and are not intended to limit the scope of the one or more embodiments.

In addition, information that is known to one of ordinary skill in the art is not provided herein.

EXAMPLES

Example 1

Preparation of Electrolyte for Lithium Secondary Battery

An electrolyte for a lithium secondary battery was prepared by adding 0.1 wt % of tryptamine as an additive and 1.3 M $LiPF_6$ as a lithium salt to a mixed organic solvent including 30 volume % of ethylene carbonate, 50 volume % of diethyl carbonate, and 20 volume % of ethyl methyl carbonate.

Example 2

Preparation of Electrolyte for Lithium Secondary Battery

An electrolyte for a lithium secondary battery was prepared in the same manner as in Example 1, except that 0.1 wt % of 1-(phenylsulfonyl) was used as an additive instead of 0.1 wt % of tryptamine.

Example 3

Preparation of Electrolyte for Lithium Secondary Battery

An electrolyte for a lithium secondary battery was prepared in the same manner as in Example 1, except that 0.1 wt % of tryptophan was used as an additive instead of 0.1 wt % of tryptamine.

Example 4

Preparation of Electrolyte for Lithium Secondary Battery

An electrolyte for a lithium secondary battery was prepared in the same manner as in Example 1, except that 0.1 wt % of 1,3-dihydro-1,3,3-trimethylspiro[2H-indole-2,3'-[3H]-phenanth[9,10-b](1,4)oxazine] was used as an additive instead of 0.1 wt % of tryptamine.

Example 5

Preparation of Electrolyte for Lithium Secondary Battery

An electrolyte for a lithium secondary battery was prepared in the same manner as in Example 1, except that 0.05 wt % of tryptophan was used as an additive instead of 0.1 wt % of tryptamine.

Example 6

Preparation of Electrolyte for Lithium Secondary Battery

An electrolyte for a lithium secondary battery was prepared in the same manner as in Example 1, except that 2 wt % of tryptophan was used as an additive instead of 0.1 wt % of tryptamine.

Comparative Example 1

Preparation of Electrolyte for Lithium Secondary Battery

An electrolyte for a lithium secondary battery was prepared by adding 1.3 M $LiPF_6$ as a lithium salt to a mixed organic solvent including 30 volume % of ethylene carbonate, 50 volume % of diethyl carbonate, and 20 volume % of ethyl methyl carbonate, not using an additive.

Comparative Example 2

Preparation of Electrolyte for Lithium Secondary Battery

An electrolyte for a lithium secondary battery was prepared in the same manner as in Example 1, except that 0.1 wt % of indole was used as an additive instead of 0.1 wt % of tryptamine.

Comparative Example 3

Preparation of Electrolyte for Lithium Secondary Battery

An electrolyte for a lithium secondary battery was prepared in the same manner as in Example 1, except that 0.1 wt % of 5-methoxyindole was used as an additive instead of 0.1 wt % of tryptamine.

Example 7

Manufacturing of Lithium Secondary Battery $Li_{1.04}Ni_{0.45}CO_{0.16}Mn_{0.35}O_2$ powder as a positive active material, a binder prepared by dissolving 5 wt % of polyvinylidene fluoride (PVdF) in N-methylpyrrolidone (NMP), and a conductive agent (Denka black) were added in a weight ratio of 92:4:4 to an agate mortar and mixed to prepare a slurry. The slurry was coated on an aluminum foil having a thickness of 15 μm by bar coating. The resultant product was placed in an oven at a temperature of 90° C. and dried for about 2 hours to evaporate NMP, and then placed in a vacuum oven at a temperature of 120° C. and dried for about 2 hours to completely evaporate NMP. Then, the resultant product was pressed and punched to obtain a positive electrode for a coin cell having a thickness of 60 μm. The capacity of the positive electrode was about 1.7 mAh/cm², and the thickness of the positive electrode was in the range of about 50 to about 60 μm.

A 2032 coin-type lithium secondary battery was manufactured by using a positive electrode having a diameter of 1.5 cm, a graphite negative electrode having a diameter of 1.6 cm, a polyethylene separator, and the electrolyte of Example 1.

Example 8

Manufacturing of Lithium Secondary Battery

A 2032 coin-type lithium secondary battery was manufactured in the same manner as in Example 7, except that the electrolyte prepared according to Example 2 was used.

Example 9

Manufacturing of Lithium Secondary Battery

A 2032 coin-type lithium secondary battery was manufactured in the same manner as in Example 7, except that the electrolyte prepared according to Example 3 was used.

Example 10

Manufacturing of Lithium Secondary Battery

A 2032 coin-type lithium secondary battery was manufactured in the same manner as in Example 7, except that the electrolyte prepared according to Example 4 was used.

Example 11

Manufacturing of Lithium Secondary Battery

A 2032 coin-type lithium secondary battery was manufactured in the same manner as in Example 7, except that the electrolyte prepared according to Example 5 was used.

Example 12

Manufacturing of Lithium Secondary Battery

A 2032 coin-type lithium secondary battery was manufactured in the same manner as in Example 7, except that the electrolyte prepared according to Example 6 was used.

Comparative Example 4

Manufacturing of Lithium Secondary Battery

A 2032 coin-type lithium secondary battery was manufactured in the same manner as in Example 7, except that the electrolyte prepared according to Comparative Example 1 was used.

Comparative Example 5

Manufacturing of Lithium Secondary Battery

A 2032 coin-type lithium secondary battery was manufactured in the same manner as in Example 7, except that the electrolyte prepared according to Comparative Example 2 was used.

Comparative Example 6

Manufacturing of Lithium Secondary Battery

A 2032 coin-type lithium secondary battery was manufactured in the same manner as in Example 7, except that the electrolyte prepared according to Comparative Example 3 was used.

Experimental Example 1

Charge and Discharge Test for Lithium Secondary Battery

The 2032 coin-type lithium secondary batteries manufactured according to Examples 7 to 12 and Comparative Examples 4 through 6 underwent charging and discharging for formation twice at room temperature. In the formation process, the 2032 coin-type lithium secondary batteries were charged with a constant current of 0.2 C until the voltage reached 4.4 V and then charged at a constant voltage until the current reached 0.05 C. Then, discharging was performed with a constant current of 0.2 C until the voltage reached 2.8 V. The 2032 coin-type lithium secondary battery that underwent the charging and discharging for formation was charged with a current of 0.5 C in the method described above and then discharged with a current of 0.2 C until the voltage reached 2.8 V. Then, the 2032 coin-type lithium secondary batteries were charged with a current of 1 C in a constant-temperature chamber at a temperature of 45° C. in the method described above and then, discharged with a current of 1 C until the voltage reached 2.8 V. Then, the discharge capacity (discharge capacity at $1^{st}$ cycle) was measured. The charging and discharging were repeatedly performed to evaluate a cycle lifetime. The discharge capacity of the 2032 coin-type lithium secondary batteries in each cycle and the discharge capacity thereof at $300^{th}$ cycle were measured, and a cycle retention rate was calculated therefrom. The cycle retention rate (%) is calculated using Equation 1 below:

Cycle retention rate (%)=discharge capacity at $300^{th}$ cycle/discharge capacity at 1st cycle  [Equation 1]

The cycle retention rate calculated as described above is shown in Table 1 below:

TABLE 1

|  | Example 7 | Example 8 | Example 9 | Example 10 | Example 11 | Example 12 | Comparative Example 4 | Comparative Example 5 | Comparative Example 6 |
|---|---|---|---|---|---|---|---|---|---|
| discharge capacity | 2.67 | 2.69 | 2.60 | 2.60 | 2.53 | 2.68 | 2.55 | 2.64 | 2.63 |

TABLE 1-continued

| | Example 7 | Example 8 | Example 9 | Example 10 | Example 11 | Example 12 | Comparative Example 4 | Comparative Example 5 | Comparative Example 6 |
|---|---|---|---|---|---|---|---|---|---|
| at 1st cycle (mAh) | | | | | | | | | |
| discharge capacity at 300th cycle (mAh) | 2.04 | 2.05 | 2.03 | 2.01 | 1.95 | 2.05 | 1.85 | 2.00 | 1.99 |
| Cycle retention rate (%) | 77.0 | 76.2 | 78.0 | 77.4 | 77.0 | 76.4 | 72.7 | 75.8 | 75.5 |

Referring to Table 1, the lithium secondary batteries of Examples 7 to 12 have higher cycle retention rates than those of the lithium secondary batteries of Comparative Examples 4 to 6.

As described above, according to the one or more embodiments of the present disclosure, an electrolyte for a lithium secondary battery is used to form a thin polar film on a surface of a positive electrode, and thus a lithium secondary battery including the electrolyte has improved high-temperature lifetime characteristics and high-temperature conservation characteristics. In addition, a lithium secondary battery including a film formed of an indole derivative compound having a specific polar substituent will have increased lithium ion conductivity.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. An electrolyte for a lithium secondary battery, comprising a lithium salt, a non-aqueous organic solvent, and an additive represented by Formula 1 below:

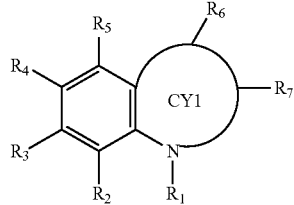

<Formula 1> wherein

CY1 is an aromatic heterocyclic ring or a ring-connected C4-C6 non-aromatic heterocyclic ring; and $R_1$ through $R_7$ are each independently hydrogen, a cyano group, —OR (R is a C1-C10 alkyl group or a C6-C20 aryl group), —C(═O)$R_a$, —C(═O)O$R_a$, —OCO (O$R_a$), —(X)$_n$—NH$_2$ (X is a C1-C10 alkyl group or a C1-C10 alkoxy group, n is an integer of 0 to 10), —C═N($R_a$), —S$R_a$, —S(═O)$R_a$, —S(═O)$_2R_a$, a substituted or non-substituted C1-C20 alkyl group, a substituted or non-substituted C1-C20 alkoxy group, a substituted or non-substituted C2-C20 alkenyl group, a substituted or non-substituted C2-C20 alkynyl group, a C2-C20 alkylene oxide group, a substituted or non-substituted C3-C30 cycloalkyl group, a substituted or non-substituted C6-C30 aryl group, a substituted or non-substituted C6-C30 aryloxy group, a substituted or non-substituted C6-C30 heteroaryl group, or combinations thereof, wherein $R_a$ is hydrogen, a C1-C10 alkyl group, or a C6-C20 aryl group and wherein at least one of $R_1$ to $R_7$ includes a polar functional group selected from the group consisting of a cyano group, —OR (R is a C1-C10 alkyl group or a C6-C20 aryl group), —C(═O)$R_a$, —C(═O)O$R_a$, —OCO (O$R_a$), —(X)$_n$—NH$_2$ (X is a C1-C10 alkyl group or a C1-C10 alkoxy group, n is an integer of 0 to 10), —C═N($R_a$), —S$R_a$, —S(═O)$R_a$, and —S(═O)$_2R_a$.

2. The electrolyte of claim 1, wherein the additive is represented by Formula 2 below:

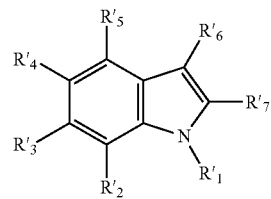

<Formula 2> wherein $R'_1$ through $R'_7$ are each independently hydrogen, a cyano group, —OR (R is a C1-C10 alkyl group or a C6-C20 aryl group), —C(═O)$R_a$, —C(═O)O$R_a$, —(X)$_n$—NH$_2$ (X is a C1-C5 alkyl group or a C1-C5 alkoxy group, n is an integer of 0 to 5), —C═N($R_a$), —S$R_a$, —S(═O)$R_a$, —S(═O)$_2R_a$, a substituted or non-substituted C1-C20 alkyl group, a substituted or non-substituted C1-C20 alkoxy group, a substituted or non-substituted C2-C20 alkenyl group, a substituted or non-substituted C2-C20 alkynyl group, a substituted or non-substituted C3-C30 cycloalkyl group, a substituted or non-substituted C6-C30 aryl group, a substituted or non-substituted C6-C30 aryloxy group, a substituted or non-substituted C6-C30 heteroaryl group, or combinations thereof, wherein $R_a$ is hydrogen, a C1-C10 alkyl group, or a C6-C20 aryl group and wherein at least one of $R'_1$ to $R'_7$ include a polar functional group selected from the group consisting of a cyano group, —OR (R is a C1-C10 alkyl group or a C6-C20 aryl group), —C(═O)$R_a$, —C(═O)O$R_a$, —OCO (OR$_a$), —(X)$_n$—NH$_2$ (X is a C1-C10 alkyl group or a C1-C10 alkoxy group, n is an integer of 0 to 10), —C=N(R$_a$), —SR$_a$, —S(=O)R$_a$, and —S(=O)$_2$R$_a$.

3. The electrolyte of claim 2, wherein at least one of R'$_1$ to R'$_7$ is —(CH$_2$)$_n$—NH$_2$ or —(CH$_2$O)$_n$—NH$_2$ where n is an integer of 1 to 5.

4. The electrolyte of claim 2, wherein at least one of R'$_1$ to R'$_7$ is S(=O)$_2$(C$_n$H$_{2n+1}$) where n is an integer of 1 to 5, —S(=O)$_2$C$_6$H$_5$, or —S(=O)$_2$CH$_2$C$_6$H$_5$.

5. The electrolyte of claim 1, wherein the additive is represented by Formula 3 below:

<Formula 3>

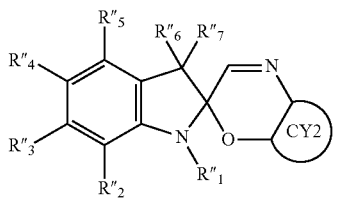

wherein

CY2 is a ring selected from the group consisting of a benzene ring, a naphthalene ring, a phenanthrene ring, an anthracene ring, a pyrene ring, a perylene ring, a cyclopentane ring, a cycloheptane ring, and derivatives thereof; and R"$_1$ to R"$_7$ are each independently hydrogen, —OR (R is a C1-C10 alkyl group or a C6-C20 aryl group), —C(=O)R$_a$, —C(=O)OR$_a$, —(X)$_n$—NH$_2$ (X is a C1-05 alkyl group or a C1-05 alkoxy group, n is an integer of 0 to 5), —C=N(R$_a$), —SR$_a$, —S(=O)R$_a$, —S(=O)$_2$R$_a$, a substituted or non-substituted C1-C20 alkyl group, a substituted or non-substituted C1-C20 alkoxy group, a substituted or non-substituted C2-C20 alkenyl group, a substituted or non-substituted C2-C20 alkynyl group, a substituted or non-substituted C3-C30 cycloalkyl group, a substituted or non-substituted C6-C30 aryl group, a substituted or non-substituted C6-C30 aryloxy group, a substituted or non-substituted C6-C30 heteroaryl group, or combinations thereof, wherein R$_a$ is hydrogen, a C1-C10 alkyl group, or a C6-C20 aryl group.

6. The electrolyte of claim 1, wherein the additive comprises at least one selected from the group consisting of

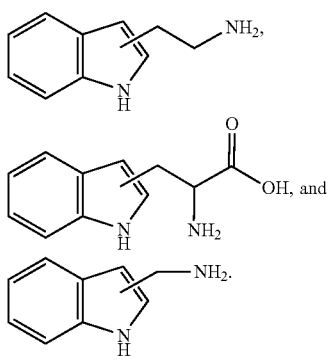

7. The electrolyte of claim 1, wherein the additive comprises at least one selected from the group consisting of

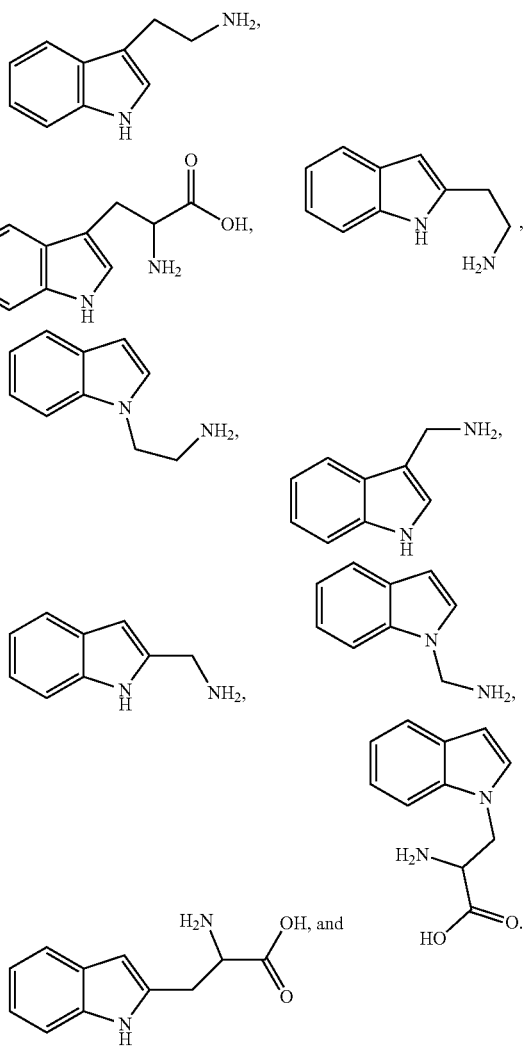

8. The electrolyte of claim 1, wherein the amount of the additive is in a range of about 0.01 to about 10 wt % based on a total weight of the electrolyte.

9. The electrolyte of claim 8, wherein the amount of the additive is in a range of about 0.01 to about 5 wt % based on a total weight of the electrolyte.

10. The electrolyte of claim 9, wherein the amount of the additive is in a range of about 0.01 to about 1 wt % based on a total weight of the electrolyte.

11. The electrolyte of claim 1, wherein the lithium salt is one selected from the group consisting of LiPF$_6$, LiBF$_4$, LiSbF$_6$, LiAsF$_6$, LiCF$_3$SO$_3$, Li(CF$_3$SO$_2$)$_3$C, Li(CF$_3$SO$_2$)$_2$N, LiC$_4$F$_9$SO$_3$, LiClO$_4$, LiAlO$_2$, LiAlCl$_4$, LiBPh$_4$, LiN(C$_x$F$_{2x+1}$SO$_2$)(C$_x$F$_{2y+1}$SO$_2$) where x and y are natural numbers, LiCl, LiI, lithium bisoxalate borate (LIBOB), and combinations thereof.

12. The electrolyte of claim 1, wherein the non-aqueous organic solvent is a carbonate-based solvent, an ester-based solvent, an ether-based solvent, a ketone-based solvent, an alcohol-based solvent, a non-protonic solvent, or combinations thereof.

13. A lithium secondary battery comprising:
a positive electrode comprising a positive active material into or from which lithium ions are intercalated or deintercalated;

a negative electrode comprising a negative active material into or from which lithium ions are intercalated or deintercalated; and an electrolyte interposed between the positive electrode and the negative electrode, wherein the electrolyte comprises a lithium salt, a non-aqueous organic solvent, and an additive represented by Formula 1 below:

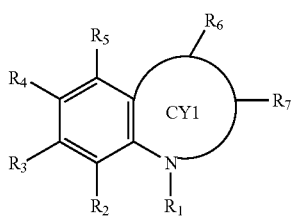

<Formula 1> wherein

CY1 is an aromatic heterocyclic ring or a ring-connected C4-C6 non-aromatic heterocyclic ring; and $R_1$ through $R_7$ are each independently hydrogen, a cyano group, —OR (R is a C1-C10 alkyl group or a C6-C20 aryl group), —C(=O)$R_a$, —C(=O)O$R_a$, —OCO(O$R_a$), —(X)$_n$—NH$_2$ (X is a C1-C10 alkyl group or a C1-C10 alkoxy group, n is an integer of 0 to 10), —C=N($R_a$), —S$R_a$, —S(=O)$R_a$, —S(=O)$_2R_a$, a substituted or non-substituted C1-C20 alkyl group, a substituted or non-substituted C1-C20 alkoxy group, a substituted or non-substituted C2-C20 alkenyl group, a substituted or non-substituted C2-C20 alkynyl group, a C2-C20 alkylene oxide group, a substituted or non-substituted C3-C30 cycloalkyl group, a substituted or non-substituted C6-C30 aryl group, a substituted or non-substituted C6-C30 aryloxy group, a substituted or non-substituted C6-C30 heteroaryl group, or combinations thereof, wherein $R_a$ is hydrogen, a C1-C10 alkyl group, or a C6-C20 aryl group and wherein at least one of $R_1$ to $R_7$ includes a polar functional group selected from the group consisting of a cyano group, —OR (R is a C1-C10 alkyl group or a C6-C20 aryl group), —C(=O)$R_a$, —C(=O)O$R_a$, —OCO(O$R_a$), —(X)$_n$—NH$_2$ (X is a C1-C10 alkyl group or a C1-C10 alkoxy group, n is an integer of 0 to 10), —C=N($R_a$), —S$R_a$, —S(=O)$R_a$, and —S(=O)$_2R_a$.

14. The lithium secondary battery of claim 13, wherein the electrolyte comprises an additive represented by Formula 2 below:

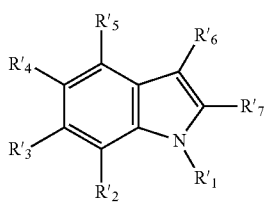

<Formula 2> wherein $R'_1$ through $R'_7$ are each independently hydrogen, a cyano group, —OR (R is a C1-C10 alkyl group or a C6-C20 aryl group), —C(=O)$R_a$, —C(=O)O$R_a$, —(X)$_n$—NH$_2$ (X is a C1-C5 alkyl group or a C1-C5 alkoxy group, n is an integer of 0 to 5), —C=N($R_a$), —S$R_a$, —S(=O)$R_a$, —S(=O)$_2R_a$, a substituted or non-substituted C1-C20 alkyl group, a substituted or non-substituted C1-C20 alkoxy group, a substituted or non-substituted C2-C20 alkenyl group, a substituted or non-substituted C2-C20 alkynyl group, a substituted or non-substituted C3-C30 cycloalkyl group, a substituted or non-substituted C6-C30 aryl group, a substituted or non-substituted C6-C30 aryloxy group, a substituted or non-substituted C6-C30 heteroaryl group, or combinations thereof, wherein $R_a$ is hydrogen, a C1-C10 alkyl group, or a C6-C20 aryl group and wherein at least one of $R'_1$ to $R'_7$ include a polar functional group selected from the group consisting of a cyano group, —OR (R is a C1-C10 alkyl group or a C6-C20 aryl group), —C(=O)$R_a$, —C(=O)O$R_a$, —OCO(O$R_a$), —(X)$_n$—NH$_2$ (X is a C1-C10 alkyl group or a C1-C10 alkoxy group, n is an integer of 0 to 10), —C=N($R_a$), —S$R_a$, —S(=O)$R_a$, and —S(=O)$_2R_a$.

15. The lithium secondary battery of claim 14, wherein at least one of $R'_1$ to $R'_7$ is —(CH$_2$)$_n$—NH$_2$ or —(CH$_2$O)$_n$—NH$_2$ where n is an integer of 1 to 5.

16. The lithium secondary battery of claim 14, wherein at least one of $R'_1$ to $R'_7$ is S(=O)$_2$(C$_n$H$_{2n+1}$) where n is an integer of 1 to 5, —S(=O)$_2$C$_6$H$_5$, or —S(=O)$_2$CH$_2$C$_6$H$_5$.

17. The lithium secondary battery of claim 13, wherein the electrolyte comprises an additive represented by Formula 3 below:

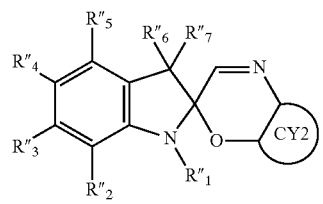

<Formula 3> wherein

CY2 is a ring selected from the group consisting of a benzene ring, a naphthalene ring, a phenanthrene ring, an anthracene ring, a pyrene ring, a perylene ring, a cyclopentane ring, a cycloheptane ring, and derivatives thereof; and $R''_1$ to $R''_7$ are each independently hydrogen, —OR (R is a C1-C10 alkyl group or a C6-C20 aryl group), —C(=O)$R_a$, —C(=O)O$R_a$, —(X)$_n$—NH$_2$ (X is a C1-05 alkyl group or a C1-C5 alkoxy group, n is an integer of 0 to 5), —C=N($R_a$), —S$R_a$, —S(=O)$R_a$, —S(=O)$_2R_a$, a substituted or non-substituted C1-C20 alkyl group, a substituted or non-substituted C1-C20 alkoxy group, a substituted or non-substituted C2-C20 alkenyl group, a substituted or non-substituted C2-C20 alkynyl group, a substituted or non-substituted C3-C30 cycloalkyl group, a substituted or non-substituted C6-C30 aryl group, a substituted or non-substituted C6-C30 aryloxy group, a substituted or non-substituted C6-C30 heteroaryl group, or combinations thereof, wherein $R_a$ is hydrogen, a C1-C10 alkyl group, or a C6-C20 aryl group.

18. The lithium secondary battery of claim 13, wherein the additive comprises at least one selected from the group consisting of

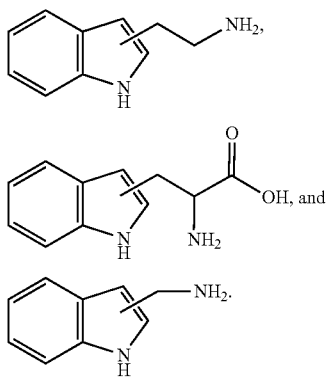

19. The lithium secondary battery of claim 13, wherein the additive comprises at least one selected from the group consisting of

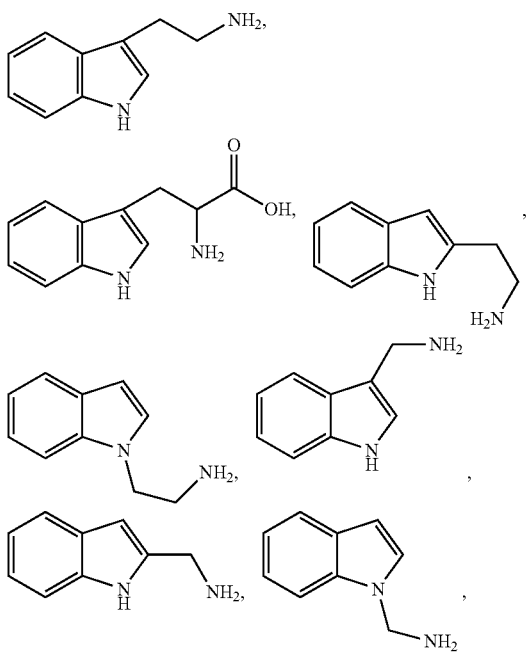

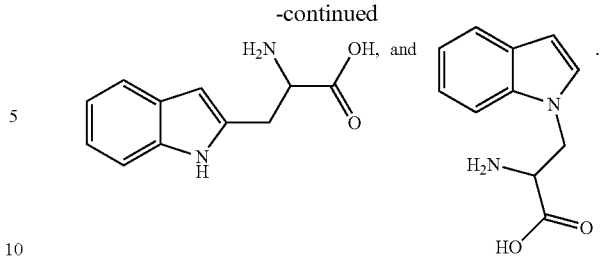

20. The lithium secondary battery of claim 13, wherein the positive electrode comprises a film formed on its surface, wherein the film is partially or wholly derived from the additive in the electrolyte.

21. The lithium secondary battery of claim 20, wherein the film comprises an inorganic layer and an organic layer in a mixed form.

22. The lithium secondary battery of claim 20, wherein the thickness of the film is in a range of about 0.5 nm to about 100 nm.

23. The lithium secondary battery of claim 13, wherein the amount of the additive is in a range of about 0.01 to about 10 wt % based on a total weight of the electrolyte.

24. The lithium secondary battery of claim 23, wherein the amount of the additive is in a range of about 0.01 to about 5 wt % based on a total weight of the electrolyte.

25. The lithium secondary battery of claim 24, wherein the amount of the additive is in a range of about 0.01 to about 1 wt % based on a total weight of the electrolyte.

26. The lithium secondary battery of claim 13, wherein the positive active material comprises $Li_{1+x}(M)_{1-x}O_2$ where $0.05 \leq x \leq 0.2$, wherein M is a transition metal.

27. The lithium secondary battery of claim 13, wherein the positive active material has an operating potential of 4.5V±0.5V.

28. The lithium secondary battery of claim 13, wherein the lithium salt is one selected from the group consisting of $LiPF_6$, $LiBF_4$, $LiSbF_6$, $LiAsF_6$, $LiCF_3SO_3$, $Li(CF_3SO_2)_3C$, $Li(CF_3SO_2)_2N$, $LiC_4F_9SO_3$, $LiClO_4$, $LiAlO_4$, $LiAlCl_4$, $LiBPh_4$, $LiN(C_xF_{2x+1}SO_2)(C_yF_{2y+1}SO_2)$ where x and y are natural numbers, LiCl, LiI, lithium bisoxalate borate (LI-BOB), and combinations thereof.

29. The lithium secondary battery of claim 13, wherein the non-aqueous organic solvent is a carbonate-based solvent, an ester-based solvent, an ether-based solvent, a ketone-based solvent, an alcohol-based solvent, a non-protonic solvent, or combinations thereof.

* * * * *